(12) United States Patent
Ortelt

(10) Patent No.: US 11,067,594 B2
(45) Date of Patent: Jul. 20, 2021

(54) FLYING OBJECT WITH A SENSOR DEVICE INCLUDING A DYNAMIC PRESSURE PROBE HAVING AN INNER AND OUTER BODY

(71) Applicant: Deutsches Zentrum für Luft-und Raumfahrt e.V., Cologne (DE)

(72) Inventor: Markus Ortelt, Flein (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 7 days.

(21) Appl. No.: 16/379,023

(22) Filed: Apr. 9, 2019

(65) Prior Publication Data
US 2019/0234986 A1 Aug. 1, 2019

Related U.S. Application Data

(63) Continuation of application No. PCT/EP2017/075202, filed on Oct. 4, 2017.

(30) Foreign Application Priority Data

Oct. 11, 2016 (DE) .......................... 102016119359.3

(51) Int. Cl.
| | |
|---|---|
| *G01P 5/16* | (2006.01) |
| *G01F 1/46* | (2006.01) |
| *G01P 5/165* | (2006.01) |
| *B64D 15/04* | (2006.01) |
| *B64D 45/00* | (2006.01) |

(52) U.S. Cl.
CPC .............. *G01P 5/165* (2013.01); *B64D 15/04* (2013.01); *B64D 45/00* (2013.01); *G01F 1/46* (2013.01); *B64D 2045/0085* (2013.01)

(58) Field of Classification Search
None
See application file for complete search history.

(56) References Cited

U.S. PATENT DOCUMENTS 2,858,698 A    11/1958  Hickey

FOREIGN PATENT DOCUMENTS

| AT | 516021 A4 | 2/2016 |
|---|---|---|
| DE | 1194267 B | 6/1965 |
| DE | 102012209352 A1 | 12/2013 |

(Continued)

OTHER PUBLICATIONS

German Examination Report for German Application No. 10 2016 119 359.3, dated May 29, 2017—7 pages.

(Continued)

*Primary Examiner* — Harshad R Patel

(57) ABSTRACT

A dynamic pressure probe for a sensor device can determine the relative speed of an object and a medium surrounding that object, in particular for gathering flight data on a flying object. The dynamic pressure probe includes an outer body with a wall in which an inflow opening is formed and which encloses an inner space, as well as an inner body which is arranged at least partially in the inner space and which encloses a measuring space as a constituent part of the inner space. Medium is able to flow through the inflow opening and is able to be dammed in the measuring space. The inner body is able to be acted upon with a protective fluid, in particular a gas, on a side remote from the measuring space and includes passages through which protective fluid is able to flow into the measuring space.

27 Claims, 12 Drawing Sheets

(56) References Cited

FOREIGN PATENT DOCUMENTS

| WO | 9909376 A1 | 2/1999 |
| WO | 2016000008 A1 | 1/2016 |

OTHER PUBLICATIONS

International Search Report and Written Opinion for International Application No. PCT/EP2017/075202, dated Nov. 20, 2017—9 pages.
International Preliminary Report on Patentability for International Application No. PCT/EP2017/075202, dated Apr. 16, 2019, 9 pages.

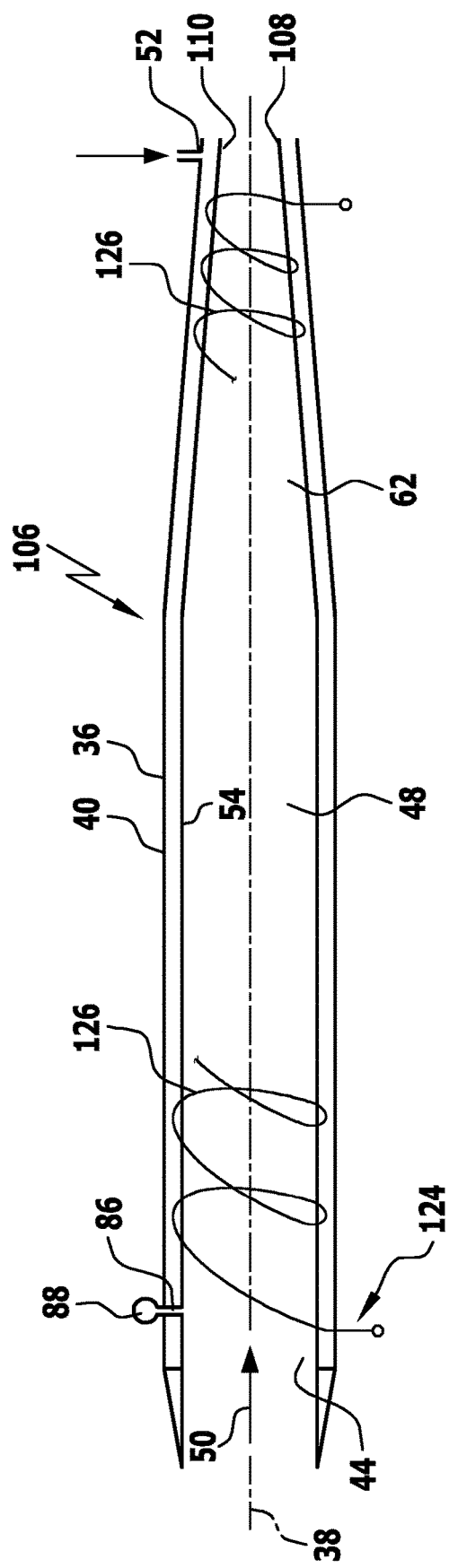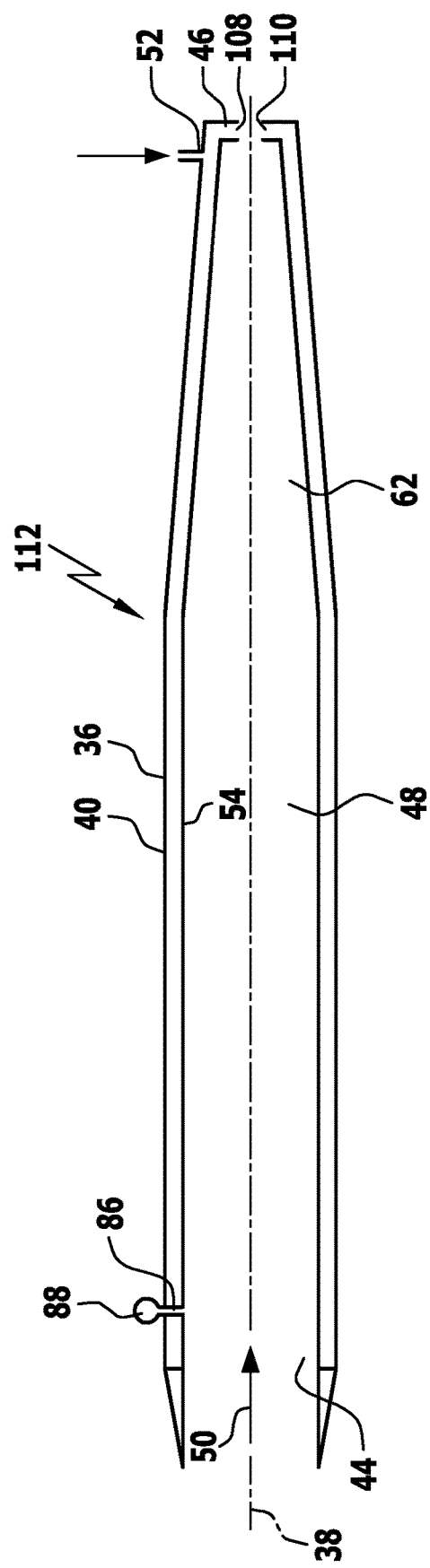

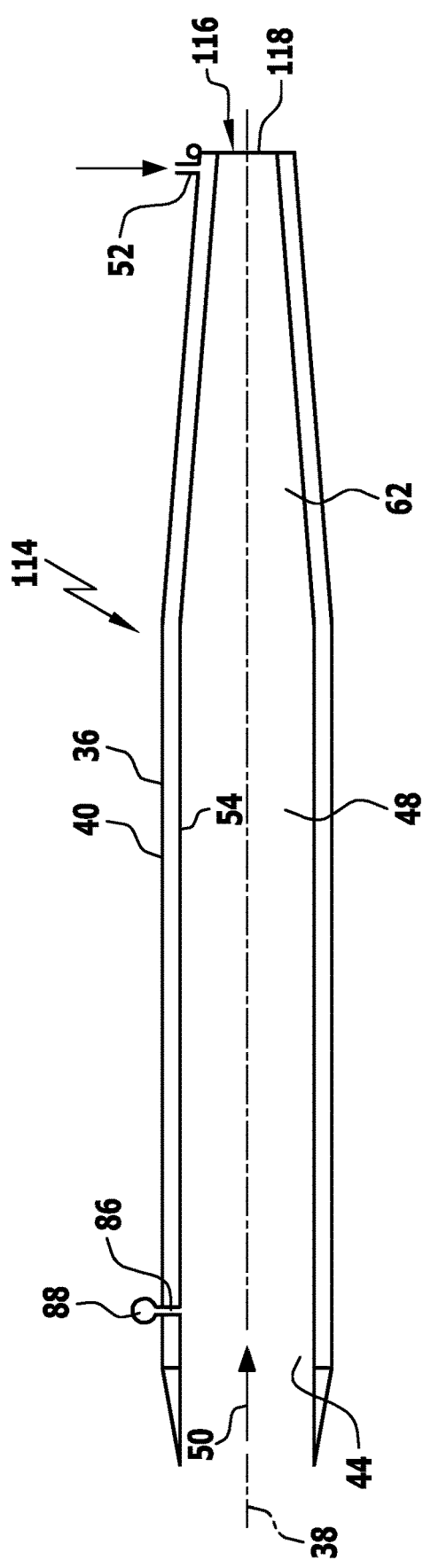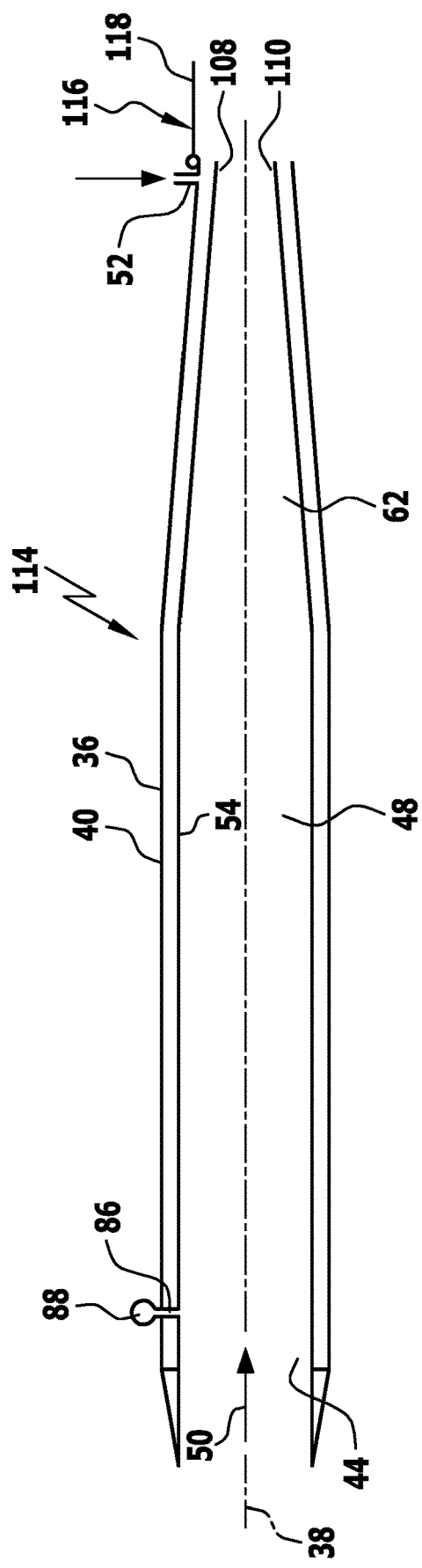

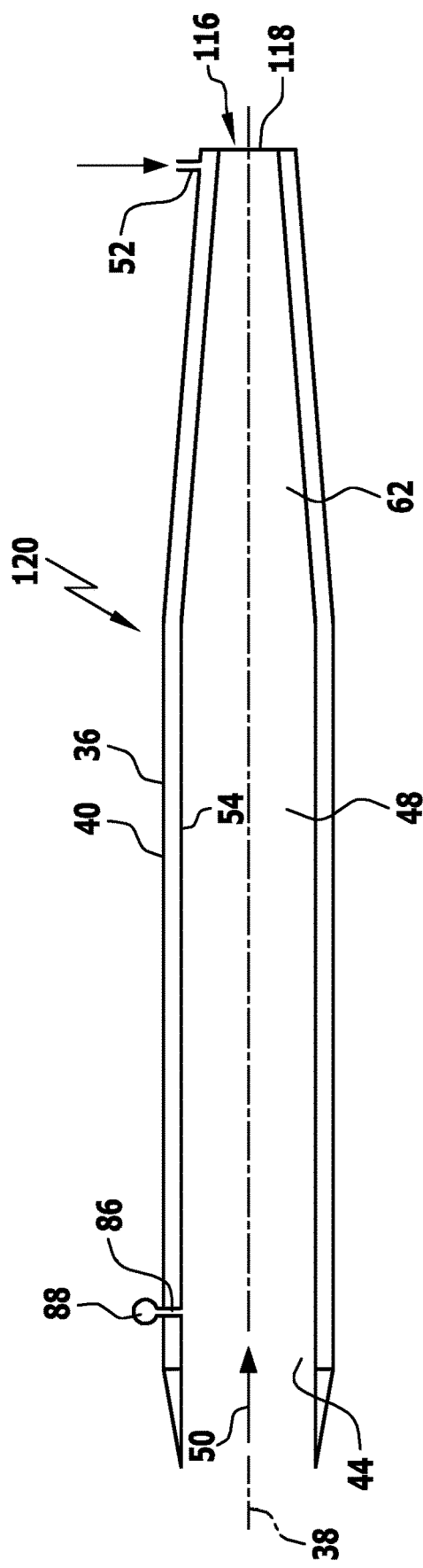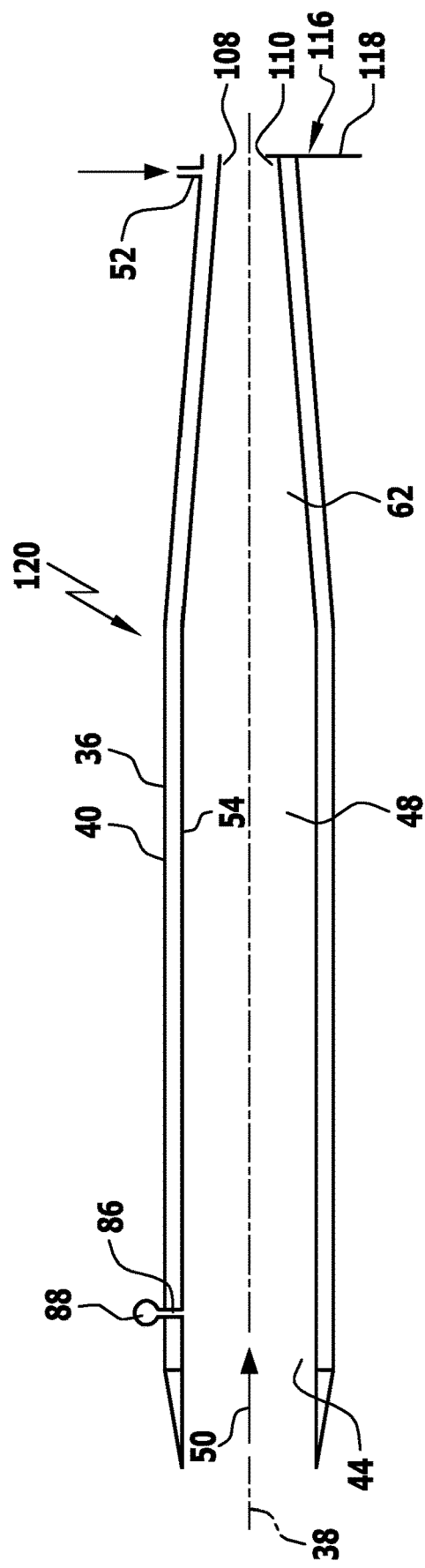

FLYING OBJECT WITH A SENSOR DEVICE INCLUDING A DYNAMIC PRESSURE PROBE HAVING AN INNER AND OUTER BODY

CROSS-REFERENCE TO RELATED APPLICATIONS

This application is a continuation patent application of international application number PCT/EP2017/075202, filed Oct. 4, 2017, and claims the benefit of German application number 10 2016 119 359.3, filed Oct. 11, 2016, which are incorporated herein by reference in their entirety and for all purposes.

FIELD

The present disclosure relates to a dynamic pressure probe for a sensor device for determining the relative speed of an object and a medium surrounding said object, in particular for gathering flight data on a flying object, wherein the dynamic pressure probe comprises a body with a wall in which an inflow opening is formed and which encloses an inner space.

The present disclosure also relates to a flying object, in particular an aircraft, with a sensor device, comprising a dynamic pressure probe.

BACKGROUND

A dynamic pressure probe of the kind stated at the outset may be used, e.g., with an object which is movable relative to an ambient medium, in particular a flying object like, for example, an aircraft and in particular airplane. On the basis of the sensor device comprising the dynamic pressure probe, for example the displayed intrinsic speed and preferably the true or the calibrated intrinsic speed of the flying object may be determined as relevant flight data. The dynamic pressure probe may be referred to as a "Pitot tube" or "Pitot probe", for example, wherein in the present case, a generic term of that kind is to be considered nonlimiting for the present disclosure.

Dynamic pressure probes in aviation are of great relevance for flight safety, which is why a multitude of dynamic pressure probes are used in larger aircrafts. Using the redundant information, it is possible to check characteristic variables relevant to flight, determined using the multitude of dynamic pressure probes, for conformance, to identify errors or operational disturbances, to initiate countermeasures if necessary, or to perform calibrations. Problematic is, for example, an icing or the accumulation of particles which reduce the inflow cross section or the cross section of the inner space and in this way lead to measurement errors or even make a measurement impossible.

An object underlying the present disclosure is to provide a dynamic pressure probe and a flying object, by use of which or in the case of which there is a higher operational safety.

SUMMARY

In a first aspect of the present disclosure, a dynamic pressure probe for a sensor device for determining the relative speed of an object and a medium surrounding said object is provided, in particular for gathering flight data on a flying object. The dynamic pressure probe comprises an outer body with a wall in which an inflow opening is formed and which encloses an inner space, as well as an inner body which is arranged at least partially in the inner space and which encloses a measuring space as a constituent part of the inner space. A medium is able to flow through the inflow opening and is able to be dammed in the measuring space, wherein the inner body is able to be acted upon with a protective fluid, in particular a gas, on a side remote from the measuring space. The inner body comprises passages through which protective fluid is able to flow into the measuring space.

In a second aspect of the present disclosure, a flying object, in particular aircraft, comprises a sensor device with a dynamic pressure probe in accordance with the first aspect, wherein the pressure and/or the temperature of the medium in the measuring space is determinable with the sensor device.

BRIEF DESCRIPTION OF THE DRAWINGS

The foregoing summary and the following description may be better understood in conjunction with the drawings, of which:

FIG. 12: shows a schematic sectional view of a further preferred embodiment of a dynamic pressure probe in accordance with the present disclosure;

FIG. 13: shows a schematic sectional view of a further preferred embodiment of a dynamic pressure probe in accordance with the present disclosure;

FIG. 14: shows a schematic sectional view of a further preferred embodiment of a dynamic pressure probe in accordance with the present disclosure, with a closing element adopting a closing position;

FIG. 15: shows the dynamic pressure probe from FIG. 14, wherein the closing element adopts an opening position;

FIG. 16: shows a schematic sectional view of a further preferred embodiment of a dynamic pressure probe in accordance with the present disclosure, with a closing element adopting a closing position; and FIG. 17: shows the dynamic pressure probe from FIG. 14, wherein the closing element adopts an opening position.

DETAILED DESCRIPTION

Figure 1:
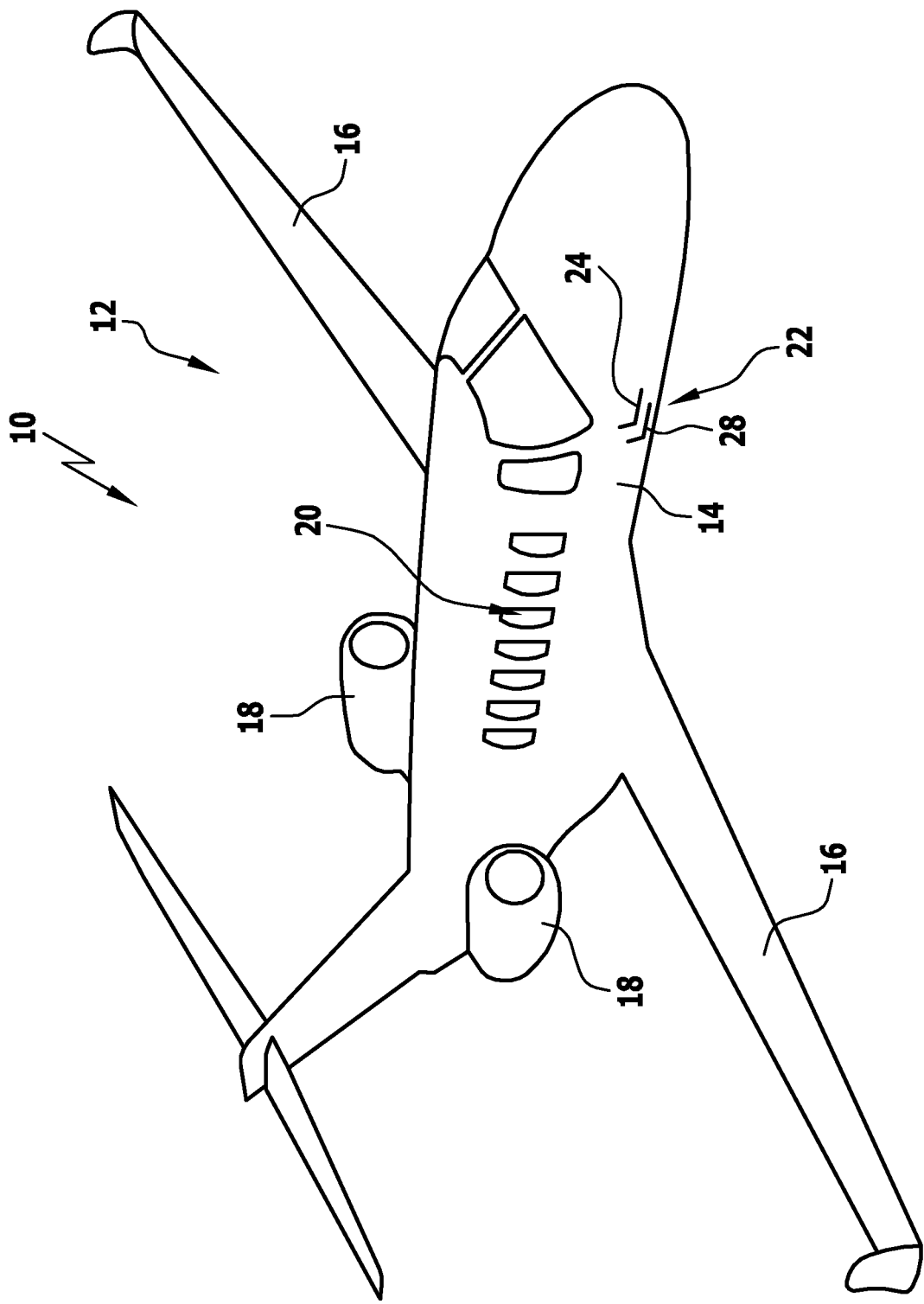
FIG. 1: shows a schematic perspective depiction of a flying object in accordance with the present disclosure, comprising a sensor device with a dynamic pressure probe in accordance with the present disclosure.

Although the present disclosure is illustrated and described herein with reference to specific embodiments, the present disclosure is not intended to be limited to the details shown. Rather, various modifications may be made in the details within the scope and range of equivalents and without departing from the present disclosure.

The present disclosure relates to a dynamic pressure probe for a sensor device for determining the relative speed of an object and a medium surrounding said object, in particular for gathering flight data on a flying object, wherein the dynamic pressure probe comprises a body with a wall in which an inflow opening is formed and which encloses an inner space. The dynamic pressure probe further comprises an inner body which is arranged at least partially in the inner space and which encloses a measuring space as a constituent part of the inner space, wherein medium is able to flow through the inflow opening and is able to be dammed in the measuring space, wherein the inner body is able to be acted upon with a protective fluid, in particular a gas, on a side remote from the measuring space and comprises passages through which protective fluid is able to flow into the measuring space.

In the dynamic pressure probe in accordance with the present disclosure, an outer body enclosing the inner space and an inner body which is arranged at least partially in the inner space and enclosing the measuring space are provided. The fluid is able to flow through the inflow opening along an inflow direction into the measuring space. A protective fluid may be introduced into the measuring space through the passages of the inner body. Accumulations of particles, drops of liquid, ice, etc. may be struck by the protective fluid and detached. A clogging of the dynamic pressure probe by particles, icing, drops of liquid or the like may in this way be effectively inhibited and the operational safety increased. In a dynamic pressure probe in accordance with the present disclosure, it is preferably possible to provide a flow of the protective fluid out of the measuring space which is directed opposite to the medium. Deposits may in this way be effectively struck by the protective fluid and thereby "washed away", as it were.

A measuring element of a sensor device comprising the dynamic pressure probe is, for example, flow-connected to the measuring space by way of a measuring conduit, in order to determine the pressure and/or the temperature of the medium. A measuring element may alternatively or in addition also be arranged in the measuring space itself. Accordingly, the determination of the pressure and/or the temperature may be carried out with the dynamic pressure probe, in accordance with the present disclosure, itself or with additional components of the sensor device, wherein in the latter case, the dynamic pressure probe may be free of a measuring element or sensor element.

Due to the ability of the protective fluid to enter into the measuring space through the passages of the inner body, the dynamic pressure probe may be referred to as a transpiration or effusion dynamic pressure probe.

It is advantageous if a gas is used as the protective fluid. "Gas" presently also comprises a gas mixture. The gas is favorably dry in order to prevent the introduction of moisture into the measuring space. The gas may be heated. In the case of a flying object, provision is advantageously made for gas to be supplied from a cabin or in particular warm or hot engine gas from an engine.

Provision may be made for the protective fluid to be supplied under pressure.

The dynamic pressure probe is advantageously of tubular configuration at least in sections, with a tubular outer body and a tubular inner body aligned coaxial to the outer body. The outer body and the inner body define a common axis along which the medium is able to flow into the measuring space. The axis is preferably aligned perpendicular to the plane of the inflow opening. The outer body and the inner body have a respective length and a respective cross section to the axis, wherein outer and inner body are preferably of elongate configuration with a length which significantly exceeds the dimensions transverse to the axis.

A reference to an inflow direction of the medium into the measuring space may presently be interpreted as a reference to the axis mentioned above if outer and inner body define an axis of that kind. "In the inflow direction" may therefore presently be interpreted in particular as "in axial direction" or "axially parallel".

The dynamic pressure probe may have, for example, a round or polygonal cross section in relation to an inflow direction of the medium through the inflow opening into the measuring space. The cross section may, for example, be circular or rectangular, in particular square. The cross section plane is in particular perpendicular to axis mentioned above.

It proves to be advantageous if arranged or formed on or in the wall is an inlet opening or a connection for the supply of the protective fluid, through which protective fluid is able to flow into an interspace between the wall and the inner body. The protective fluid may be supplied via a supply conduit which is connected to the connection or which opens into the interspace via the inlet opening. The inner body is acted upon with protective fluid on a side remote from the measuring space, which fluid is able to flow through the passages into the measuring space.

Provision may be made for the inlet opening or the connection to be arranged on a side of the outer body opposite the inflow opening. It is thereby made easier to form a pressure gradient for protective fluid flowing into the measuring space, whereby said fluid is able to flow out of the measuring space as mentioned above and thereby strike deposits. "Opposite" may be presently also be interpreted in particular as "arranged on a side remote from the inflow opening", for example on an opposite/remote end or end region.

In a preferred implementation of the dynamic pressure probe, it is favorable if the wall has a side wall surrounding the inner space and if the inner body is accommodated in the outer body by positive fit and is supported on the side wall, wherein preferably formed between the side wall and the inner body are channels for the protective fluid which are flow-connected to the passages. For example, a multitude of channels are formed in circumferential direction of the inflow direction or the axis between the inner body and the side wall. The channels are preferably uniformly spaced apart from each other. The channels preferably run axially parallel. In the region of the inlet opening or the connection, an annular channel may be provided, for example, in order to act upon the multitude of channels with protective fluid, wherein the channels preferably extend over the entire or a majority of the length of the inner body.

In an advantageous implementation of the dynamic pressure probe, provision may be made for the wall to have a rear wall opposite the inflow opening and for the inner body to have a rearward section opposite the inflow opening, wherein an interspace flow-connected to the passages is formed between the rear wall and the rearward section. The interspace is in particular in flow-connection with the inlet opening or the connection of the wall, such that the inner body is able to be acted upon with protective fluid at the rearward section delimiting the measuring space.

It proves to be advantageous if passages of the inner body are configured such that the protective fluid flows into the measuring space transverse and in particular perpendicular in relation to an inflow direction of the medium into the measuring space. For example, the inflow occurs perpendicularly or radially in relation to the axis of the inner body. The inner body may have a section surrounding the measuring space, through which section the medium is able to flow transverse and in particular perpendicular to the inflow direction.

Alternatively or in addition, provision may be made for passages of the inner body to be configured such that the protective fluid flows into the measuring space counter to an inflow direction of the medium into the measuring space. In particular, the protective fluid flows axially or axially parallel into the measuring space, for example through the rearward section of the inner body mentioned above.

It is favorable if the inner body extends over the entire length or substantially the entire length of the inner space, wherein the inner space is preferably provided with passages or has passages over the entire or substantially the entire length. Deposits may thereby be struck and removed by the protective fluid over the entire or substantially the entire length.

Alternatively or in addition, it is advantageous for achieving a corresponding effect if the inner body extends along the entire or substantially entire inner circumference of the wall. The inner body is hereby provided with or has passages along the entire or substantially entire inner circumference.

In an advantageous implementation, it is favorable if the inner body has front section which protrudes from the inner space over the rim of the inflow opening and which comprises passages for the protective fluid which are aligned in the direction facing away from the inner space. The front section may, for example, cover the rim and cover over the same on the outside. The passages are advantageously aligned counter to an inflow direction of the medium into the measuring space. The passages are preferably aligned axially parallel, wherein a multitude of passages may be present in circumferential direction of the axis, which are preferably uniformly spaced apart from each other. A multitude of passages at different distances from the axis in radial direction may be present.

It is advantageous if outlet openings of the passages at the front section are arranged on an outer side of the dynamic pressure probe. The protective fluid may flow out of the measuring space counter to the inflow direction, around a face side of the front section, and away from the inflow opening on the outer side of said section. Deposits on the inner body and in particular measuring space may thereby be effectively prevented.

Passages of the inner body are preferably uniformly spaced apart from each other along an inflow direction of the medium into the measuring space.

Alternatively or in addition, provision may be made for the passages of the inner body to be uniformly spaced apart from each other along a circumference of the inner body enclosing the measuring space.

The outer body, in particular the wall thereof, is advantageously gas-tight. The outer body, in particular the wall thereof, is favorably made of a metal.

It proves to be favorable if the inner body entirely or partially comprises at least one of the following or is made of one or more of the following, wherein combinations are of course also possible:
- a porous material, wherein the passages are formed by the porous nature of the material. The introduction of separate passages into the inner body is not necessary. The protective fluid is able to flow through the pores of the porous material and be guided into the measuring space in this way. The porous material is a sintered material, for example.
- a composite material, in particular a fiber composite material. For example, a carbon fiber-reinforced plastic (CFRP) or a fibrous ceramic (CMC, ceramic matrix composite) may be used. Fiber composite materials have, e.g., the quality that the matrix embedding the fibers is porous and thus permeable to a gaseous protective fluid. The porosity is of such a nature that the gas flow occurs rather in the plane of the fibers and is significantly lower perpendicular to this plane. These porous characteristics of the fiber composite material may be used to make the inner body in a simple manufacturing method. By providing a sleeve body of a fiber composite material with an axis perpendicular to the plane of the fibers, passages from the outer side into the measuring space are thereby present in the inner body. The fiber layers are axially spaced apart from each other. In the front section mentioned above, provision may be made for it to be produced as a sleeve of a fiber composite material, wherein the axis thereof is aligned in the or parallel to the plane of the fibers. This offers the possibility of providing passages parallel to the axis of the inner body, such that the protective fluid is able to flow to the outer side of the front section.
- a metallic material which presently may in particular also comprise metallic alloys. For example, a porous metal foam or a porous sintered metal may be used;
- a plastics material;
- a ceramic material, for example a fiber ceramic material (CMC, ceramic matrix composite), which has a microporous nature for forming the passages.

In an advantageous implementation of the dynamic pressure probe, provision may be made for the passages to be configured as channels, for example as bores, in the inner body.

It is advantageous if the dynamic pressure probe comprises a heating device for heating the inner body and/or the outer body. For example, windings, for instance of a heating coil, of the heating devices are present running in circumferential direction of an axis of the inner body and outer body, respectively. The windings may be embedded into the inner body or the outer body or run between them. As a result of the heating, the dynamic pressure probe may be better protected from dew and ice formation.

It is favorable if the inner body is able to be acted upon with protective fluid in such a way and/or is configured in such a way that a volumetric flow of protective fluid and/or the pressure of the protective fluid which flows through the passages into the measuring space increases from a side of the inner body remote from the inflow opening to a side facing toward the inflow opening. The volumetric flow of protective fluid and/or the pressure of the protective fluid on the side of the inner body remote from the inflow opening is thereby greater than on the side of the inner body facing toward the inflow opening. Consequently, a pressure gradient forms which results in a flow of the protective fluid that is directed counter to the inflowing medium. The protective fluid advantageously flows through the inflow opening out of the dynamic pressure probe. Deposits are struck by the protective fluid and "washed away", as it were. The change in the volumetric flow and/or the pressure of the protective fluid depending on the respective distance to the inflow opening may take place in steps or continuously.

Provision may be made for the cross sectional area and/or the number of passages per unit of length on the inner body to increase with increasing distance from the inflow opening.

Alternatively or in addition, provision may be made for the inner body to comprise a multitude of joined segments with passages, wherein the cross sectional area and/or the number of passages per unit of length at different segments differ from each other.

In both advantageous embodiments mentioned above, there is the possibility of configuring the volumetric flow of protective fluid and/or the pressure thereof on a side remote from the inflow opening to be greater than on a side facing toward the inflow opening.

As already mentioned, the protective fluid may preferably be a dry gas, wherein this may presently also be understood as a gas mixture.

Alternatively, a liquid protective fluid may be provided.

In an advantageous embodiment of the dynamic pressure probe, provision may be made for an outflow opening for the outflow of the medium from the measuring space to be formed in the wall on the side opposite the inflow opening, and for the inner body to have a through-opening for the medium. The wall may comprise a rear wall in which the outflow opening is formed. Alternatively, provision may be made for the wall to be free of a rear wall and the outer body to be entirely open on the side opposite the inflow opening. Particles like dust, dirt, drops of liquid or the like are able to flow through the outflow opening, to which end also the inner body has a through-opening. Only with low probability do deposits form. In addition, existing deposits may be struck by the protective fluid and detached from the inner body. Deposits of that kind may be entrained by the medium, for example, and be removed from the measuring space via the outflow opening.

It proves to be favorable if the dynamic pressure probe comprises a closing element which is arranged at the outflow opening and which is transferable from a closing position for at least partially closing the outflow opening into an opening position for unblocking the outflow opening. This allows the outflow opening to be unblocked if necessary, so that particles and liquid may be released from the measuring space. The outflow opening may be transferred into the opening position, e.g. periodically or depending on need, by controlling the closing element. In the regular operation of the dynamic pressure probe, the closing element may adopt the closing position, whereby the medium can be better dammed in the measuring space. The closing element is a pivotable flap or a slide, for example.

In order to simplify a damming of the medium in the measuring space, it is advantageous if the inner body has at least in sections a tapering in the inflow direction of the medium into the measuring space. That may presently be understood in particular as the inner body being configured in such a way that a cross sectional area of the measuring space transverse to the inflow direction decreases, at least over a section of the extent of the inner body along the inflow direction. In particular, a cross sectional area transverse to the axis of the inner body decreases in axial direction, at least over a section of the extent of the inner body.

As mentioned at the outset, the present disclosure also relates to a flying object. A flying object in accordance with the present disclosure, which achieves the object stated at the outset, comprises a sensor device with a dynamic pressure probe of the kind stated above, wherein the pressure and/or the temperature of the medium flowing into the measuring space is determinable with the sensor device.

The advantages which were already mentioned in conjunction with the dynamic pressure probe in accordance with the present disclosure may be achieved in the use thereof in a flying object. Reference may be made to the preceding descriptions in this regard.

Advantageous embodiments of the flying object result from advantageous embodiments of the dynamic pressure probe.

The flying object may in particular be an aircraft, for example an airplane.

The flying object may be manned or unmanned.

A measuring conduit is advantageously provided, by way of which a measuring element of the sensor device, arranged external to the outer body, is in flow-connection with the measuring space. The pressure and/or the temperature of the medium may be reliably determined by the measuring element via the measuring conduit.

It is favorable if a supply conduit for protective fluid is provided which is connected to the dynamic pressure probe and which preferably is in or is able to be brought into flow-connection with the interior of a cabin, with an engine of the flying object or with a reservoir. This offers the possibility of using heated or preheated gas from the cabin or the engine as protective fluid. Icings are able to be detached and removed by warm gas. Dew formation on the inner body may be prevented by warm gas.

The sensor device may comprise a further dynamic pressure probe. Characteristic variables relevant to flight may advantageously be determined on the basis of measurement data from both dynamic pressure probes. It is particularly favorable if the characteristic variables relevant to flight are able to be checked for conformance. The check preferably takes place in real time. This offers the possibility of carrying out a reference determination of characteristic variables relevant to flight. The further dynamic pressure probe of the sensor device may be checked for reliable functioning. Further, there is the possibility of a mutual calibration of the dynamic pressure probes.

In the following, an advantageous embodiment of a flying object in accordance with the present disclosure as well as multiple advantageous embodiments of a dynamic pressure probe in accordance with the present disclosure are described.

Identical reference numerals are used for like or functionally equivalent features and components. Regarding the different embodiments of the dynamic pressure probe, only the significant differences are addressed. The dynamic pressure probes may each be referred to as a "Pitot tube".

FIG. 1 shows in a schematic perspective depiction a flying object 10 in accordance with the present disclosure, which is configured as an airplane 12 with a fuselage 14 and wings 16. The airplane 12 has at least one engine 18, in which it may be a jet engine as depicted in the drawing. A propeller engine is also conceivable. The fuselage 14 defines a cabin 20 of the airplane 12 for pilots as well as passengers, as the case may be.

The flying object 10 comprises a sensor device 22 in accordance with the present disclosure. The sensor device 22 has a first preferred embodiment of a dynamic pressure probe in accordance with the present disclosure, which is designated with the reference numeral 24. Further, an evaluation unit 26 of the sensor device 22 is provided, a further pressure probe 28 which may be conventional. It remains reserved to the present disclosure for the dynamic pressure probe 28, too, to be configured in accordance with the present disclosure.

Figure 2:
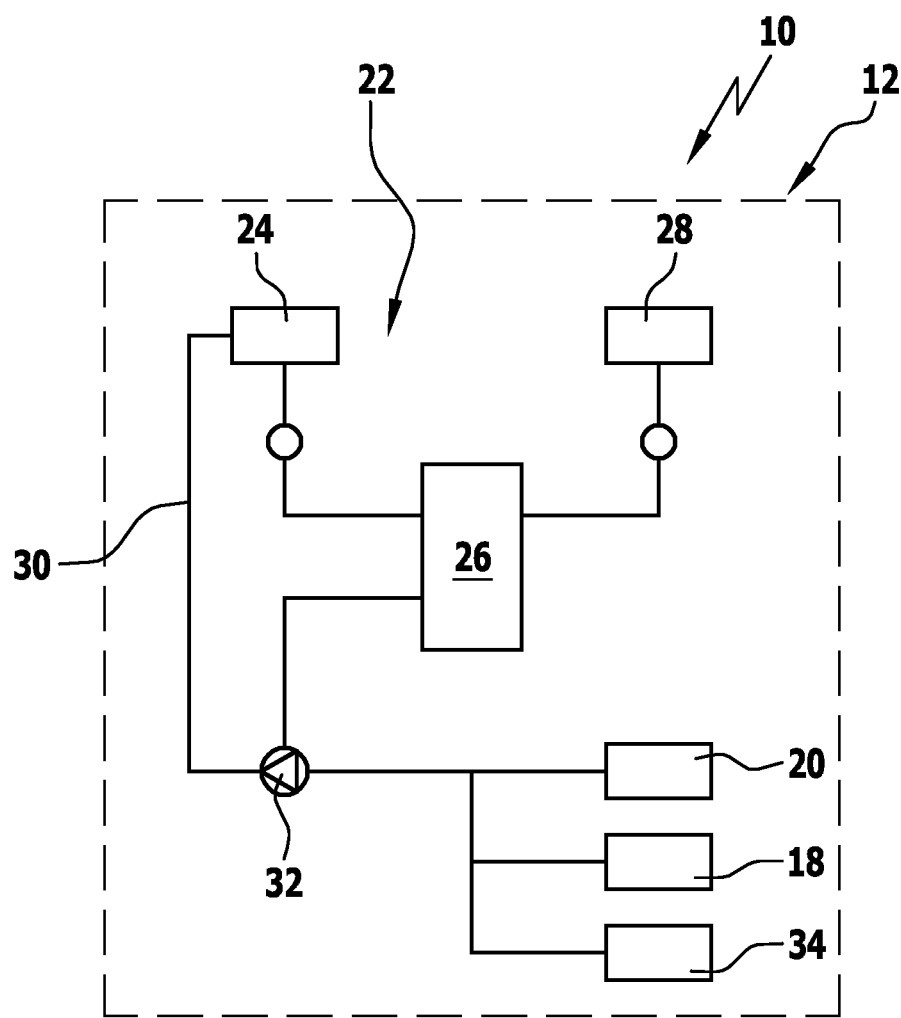
FIG. 2: shows a schematic depiction of the flying object from FIG. 1.

The airplane 12 comprises a supply conduit 30 which is connected to the dynamic pressure probe 24 on the outflow side as described below. On the inflow side, the supply conduit 30 is in flow-connection with the cabin 20. A protective fluid, in particular air and preferably dry air, may be supplied to the dynamic pressure probe 24 via the supply conduit 30 from the cabin 20. A conveying assembly 32 may be connected into the supply conduit (FIG. 2).

Alternatively or in addition, provision may be made for the supply conduit 30 to be in flow-connection with the engine 18 on the inflow side. Further, alternatively or in addition, provision may be made for the supply conduit 30 to be in flow-connection with a reservoir 34 for the protective fluid on the inflow side.

The protective fluid, as mentioned in particular air and particularly preferably dry air, is preferably heated or warmed and thereby has a temperature significantly above the dew point for water.

The dynamic pressure probe 24 and, in a corresponding manner, the dynamic pressure probe 28 may be fixed to the plane 12 in a manner known per se. For example, the dynamic pressure probes 24, 28 are attached to the fuselage 14 or to the wings 16.

Using the dynamic pressure probes 24, 28, it is possible for the sensor device 22 to determine the relative speed of the airplane 12 to the medium surrounding it. The determination of flight data may comprise, for example, the displayed indicated speed, the actual indicated speed, or the calibrated indicated speed of the airplane 12. The use of the dynamic pressure probe 24 in accordance with the present disclosure, the structure of which is described below with reference to FIGS. 3 and 4, proves to be particularly advantageous.

The dynamic pressure probe 24 comprises an outer body 36. The outer body 36 is of tubular configuration and defines an axis 38. Perpendicular to the axis 38, the outer body 36 has a round and in particular circular cross section.

The outer body 36 comprises a wall 40 with a side wall 42 surrounding the axis 38. An inflow opening 44 is formed in the wall 40 on a face side of the outer body 36. On the side opposite the inflow opening 44, the wall 40 comprises a closed rear wall 46, such that the outer body 36 as a whole forms a closed sleeve.

The outer body 36 encloses an inner space 48 by way of the wall 40. The medium surrounding the airplane 12 may flow in an inflow direction 50 through the inflow opening into the inner space 48. The inflow direction 50 runs axially or axially parallel in relation to the axis 38. References to the axis 38 are therefore also references to the inflow direction 50.

A connection 52 for the supply conduit 30 is formed on the wall 40. The connection 52 is arranged, for example, proximate to the rear wall 46 on the side opposite the inflow opening 44.

The outer body 36 is preferably made of a metallic material and is configured to be gas-tight.

The dynamic pressure probe 24 further comprises an inner body 54, which is accommodated in sections in the inner space 48. The inner body 54 is also of tubular configuration and is aligned coaxial to the outer body 36.

The inner body 54 is dimensioned in relation to the outer body 36 such that it is accommodated in the outer body 36 by positive fit. By way of a section 56 surrounding the axis 38, the inner body 54 may be supported on the side wall 42 delimiting the inner space 48. The inner body 54 further comprises a rearward section 58 on the side opposite the inflow opening 44, wherein the rearward section 58 is arranged proximate to the rear wall 46. The inner body 54 thereby forms a closed sleeve.

The inner body extends axially, substantially over the entire length of the inner space 48. In the circumferential direction of the axis 38, the inner body extends over the entire inner circumference of the wall 40.

An interspace 60 is present between the rear wall 46 and the rearward section 58. The inner body 54 in this way encloses a measuring space 62 which is a constituent part of the inner space 48. The fluid is able to flow through the inflow opening 44 into the measuring space 62 and be dammed therein.

The inner body 54 forms with the section 56 surrounding the measuring space 62 and the rearward section 58 an inner wall 64, as it were, of the dynamic pressure probe 24. The outer body 36 forms with the side wall 42 and the rear wall 46 an outer wall 66, as it were, of the dynamic pressure probe 24.

Figure 4:
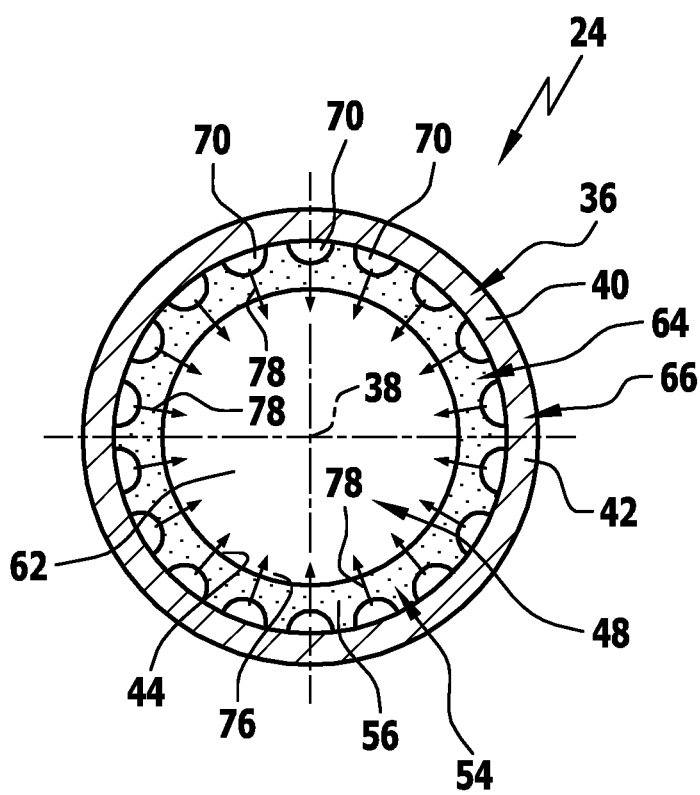
FIG. 4: shows a sectional view along the line 4-4 in FIG. 3.

The gas supplied via the supply conduit 30 enters into the interspace 60 and an interspace 68 which is arranged between the side wall 42 and the surrounding section 56. The interspace 68 may have, for example, an annular channel at the connection 52 and further comprises channels 70 which are formed between the side wall 42 and the section 56 (FIG. 4). The channels 70 preferably run axially parallel and are spaced uniformly apart from each other in circumferential direction of the axis 38.

With the dynamic pressure probe 24, it is in this way possible to act upon the inner body 54 on the side remote from the measuring space 62 with protective fluid which is supplied via the supply conduit 30 and the connection 52 into the interspace 60 and into the channels 70.

The inner body 54 further has a front section 72 which protrudes out of the inner space 48 and over a rim 74 enclosing the inflow opening 44. In the present case, the front section 72 is of truncated cone-shaped form, wherein this could also be different. A central through-opening 76 is present which is flush with the inflow opening 44. The medium is able to flow through the through-opening 76 in the inflow direction 50. The front section 72 is dimensioned such that it is flush with the rim 74 and the side wall 42 at the outer circumference. The front section 72 thereby forms a "point", as it were, of the dynamic pressure probe 24.

Facing toward the rim 74, the front section 72 may also be acted upon with the gaseous protective fluid by way of the channels 70.

In the present case, the inner body 54 of the dynamic pressure probe 24 is made of a porous material. For example, the porous material is a sintered material or a foam material (e.g. sintered metal or metal foam) which, due to its porosity, has passages for the gaseous protective fluid. The passages of a small cross section are not shown in FIGS. 3 to 7.

In a preferred embodiment, provision may be made for the inner body 54 to be made of a fiber composite material with fiber layers embedded into a porous matrix. Provision is hereby preferably made for the surrounding section 56 and the rearward section 58 to be made of the fiber composite material in such a way that the fiber layers at the surrounding section 56 are aligned transverse and in particular perpendicular to the axis 38. At the rearward section 58, the fiber layers are preferably aligned in axial direction. The same applies to the front section 72. At the latter, the fiber layers are preferably aligned parallel to the axis 38.

In an advantageous embodiment, the inner body 54 may be made of a porous CMC material (ceramic matrix composite), a fibrous ceramic material with a porous quality.

In the operation of the dynamic pressure probe 24, the gaseous protective fluid is able to flow in via the supply conduit 30 for acting upon the inner body 54 on the side remote from the measuring space 62. The gaseous protective fluid flows into the measuring space 62 through the passages of the inner body 54, for example of the porous material or the fiber composite material. The protective fluid flows through the section 56 in radial direction, through the section 58 counter to the inflow direction 50. This is symbolized in FIGS. 3 and 4 by arrows 78.

The front section 72 is also acted upon with the protective fluid in the region of the rim 74. The protective fluid flows in parallel to the axis 38 counter to the inflow direction 50 through the passages of the inner body 54 and exits via outlet openings arranged on the outer side 80 of the dynamic pressure probe 24 (arrows 82).

With dynamic pressure probes, there is the risk that particles entrained with the medium, like dirt of dust particles, settle in the inner space 48. The dynamic pressure probe may clog, which makes a determination of characteristic data relevant to flight more difficult or even impossible. A further problem is in the icing of dynamic pressure probes; due to entrained liquid, a layer of ice forms in the inner space or in the region of the inflow opening of the dynamic pressure probe.

These disadvantages may be avoided in the dynamic pressure probe 24 in accordance with the present disclosure due to the outflowing protective fluid. A flow of protective fluid, symbolized by arrows 84, along the inner body 54 results from the protective fluid. The flow of the protective fluid is directed opposite the inflow direction 50 of the medium and extends in circumferential direction of the axis 38 along the entire surrounding section as well as along the entire inner circumference of the front section 72 in the region of the through-opening 76.

A film of protective fluid forms. Adhering particles are entrained by the protective fluid and are conveyed outwards through the through-opening 76. Further, the flow of protective fluid flows around the face side of the front section 72. Protective fluid flows out on the outside, such that no particles accumulate at the front section 72, even in the region of the outlet openings 72.

Due to the preferably dry and heated gas, it is further possible to heat and defrost the adherent icings. Drops of liquid are also removed with the protective fluid.

The sensor device 22 has a measuring conduit 86, by way of which a measuring element 88 arranged external to the outer body 36 is in flow-connection with the measuring space 62. The measuring element 88 in turn is coupled to the evaluation unit 26 by way of a signal line 90. Alternatively, provision may be made for a measuring element of the sensor device 22 to be arranged in the measuring space 62 itself. The measuring element external to or in the measuring space 62 may be a constituent part of the dynamic pressure probe 24. The same applies to the evaluation unit 26.

The pressure and the temperature of the dammed medium may be determined with the measuring element 88 and a signal relating to this may be provided to the evaluation unit 26. The evaluation unit 26 may check characteristic variables relevant to flight, which are determined on using the dynamic pressure probe 24 on the one hand and using the dynamic pressure probe 28 on the other hand, for conformance. The dynamic pressure probe 24 in accordance with the present disclosure may thereby be used as a reference for the further dynamic pressure probe 28 (conventional or in accordance with the present disclosure). The operational safety of the airplane 12 is increased.

The checking by the sensor device 22 preferably takes place in real time. Alternatively or in addition, provision may be made for a check of the dynamic pressure probes 24, 28 to be performed upon start-up of the airplane 12.

Measures may be taken in case of deviations. The measures comprise, for example, the cleaning or replacement of the dynamic pressure probe 28, up to denial or revocation of a flight authorization for the airplane 12.

With reference to FIGS. 5 to 17, further advantageous embodiments of the dynamic pressure probe in accordance with the present disclosure are described in the following.

Figure 5:
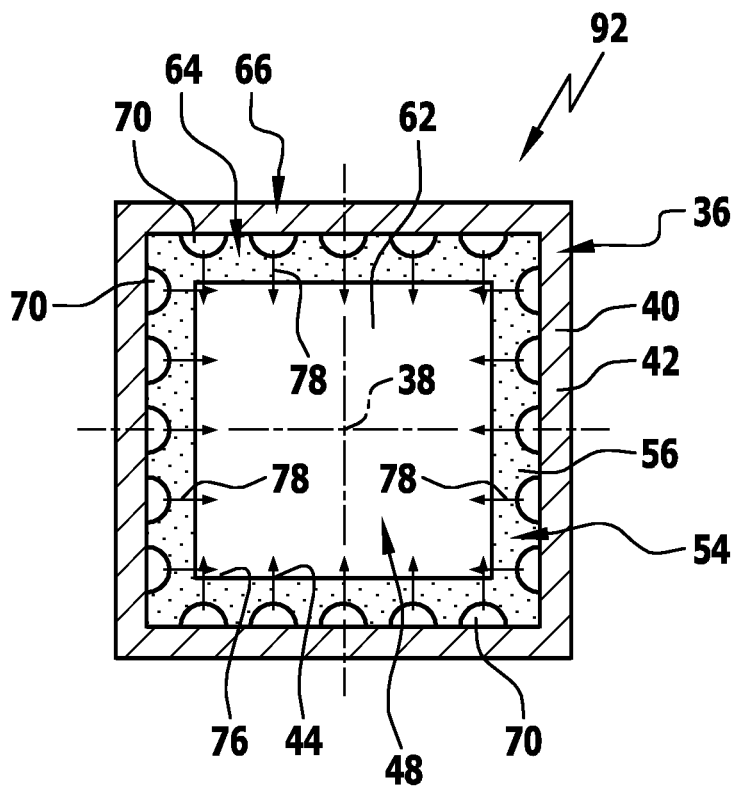
FIG. 5: shows a depiction corresponding to FIG. 4 in a further preferred embodiment of a dynamic pressure probe in accordance with the present disclosure.

FIG. 5 shows in a manner corresponding to FIG. 4 a cross sectional view in relation to the axis 38 of a dynamic pressure probe designated with the reference numeral 92. The outer body 36 and the inner body 54 hereby have a rectangular and in particular square cross section.

In embodiments of other kinds, a polygonal, non-rectangular cross section is conceivable.

Figure 3:
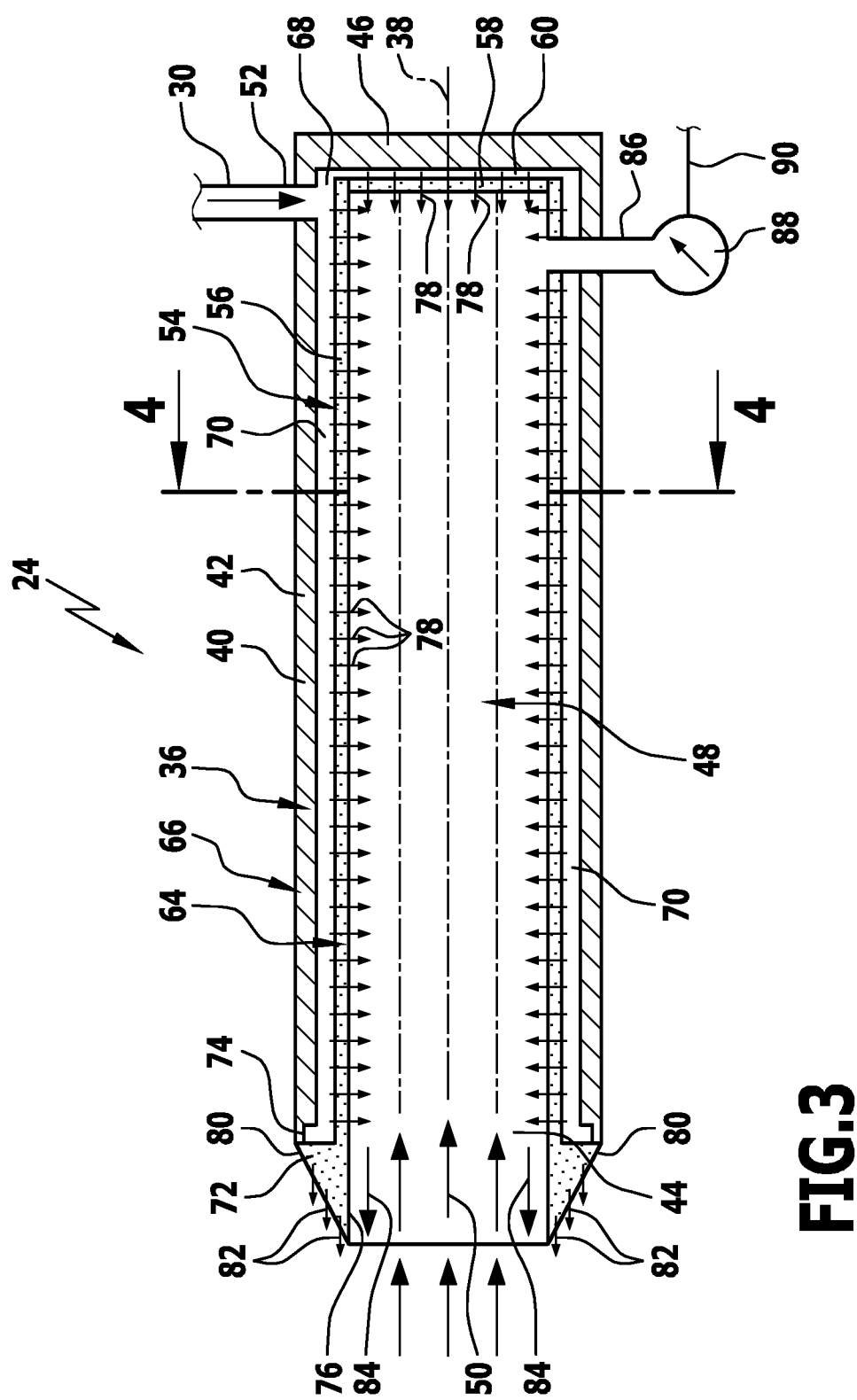
FIG. 3: shows a schematic sectional view of the dynamic pressure probe, in accordance with the present disclosure, of the flying object from FIG. 1.
Figure 6:
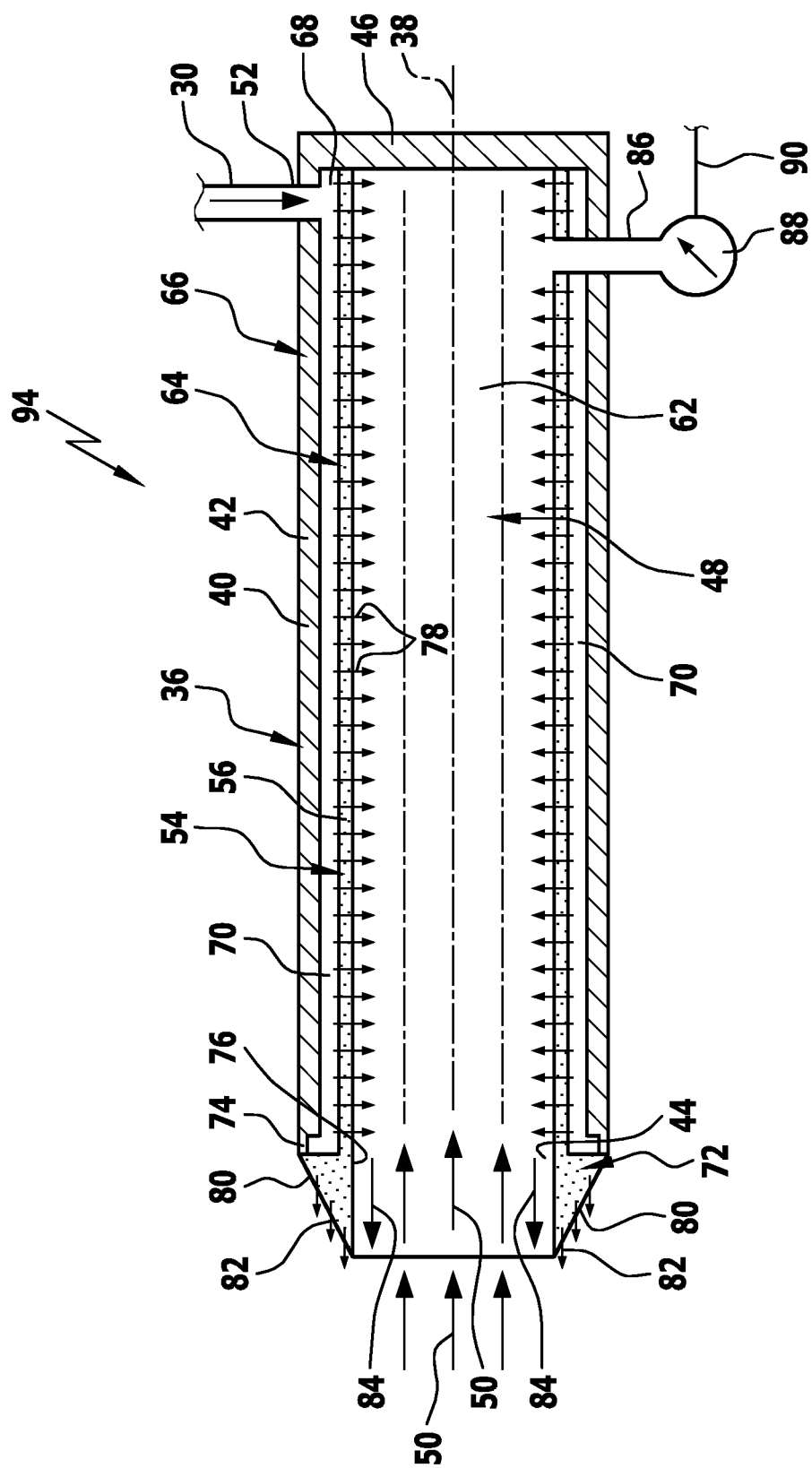
FIG. 6: shows a schematic sectional view of a further preferred embodiment of a dynamic pressure probe in accordance with the present disclosure.

FIG. 6 shows an advantageous embodiment of a dynamic pressure probe in accordance with the present disclosure, designated with the reference numeral 94, in a depiction corresponding to FIG. 3. In the case of the dynamic pressure probe 94, the rearward section 58 is omitted, such that the inner body 54 is not closed on the side opposite the inflow opening 44. The outer body comprises the rear wall 46.

Figure 7:
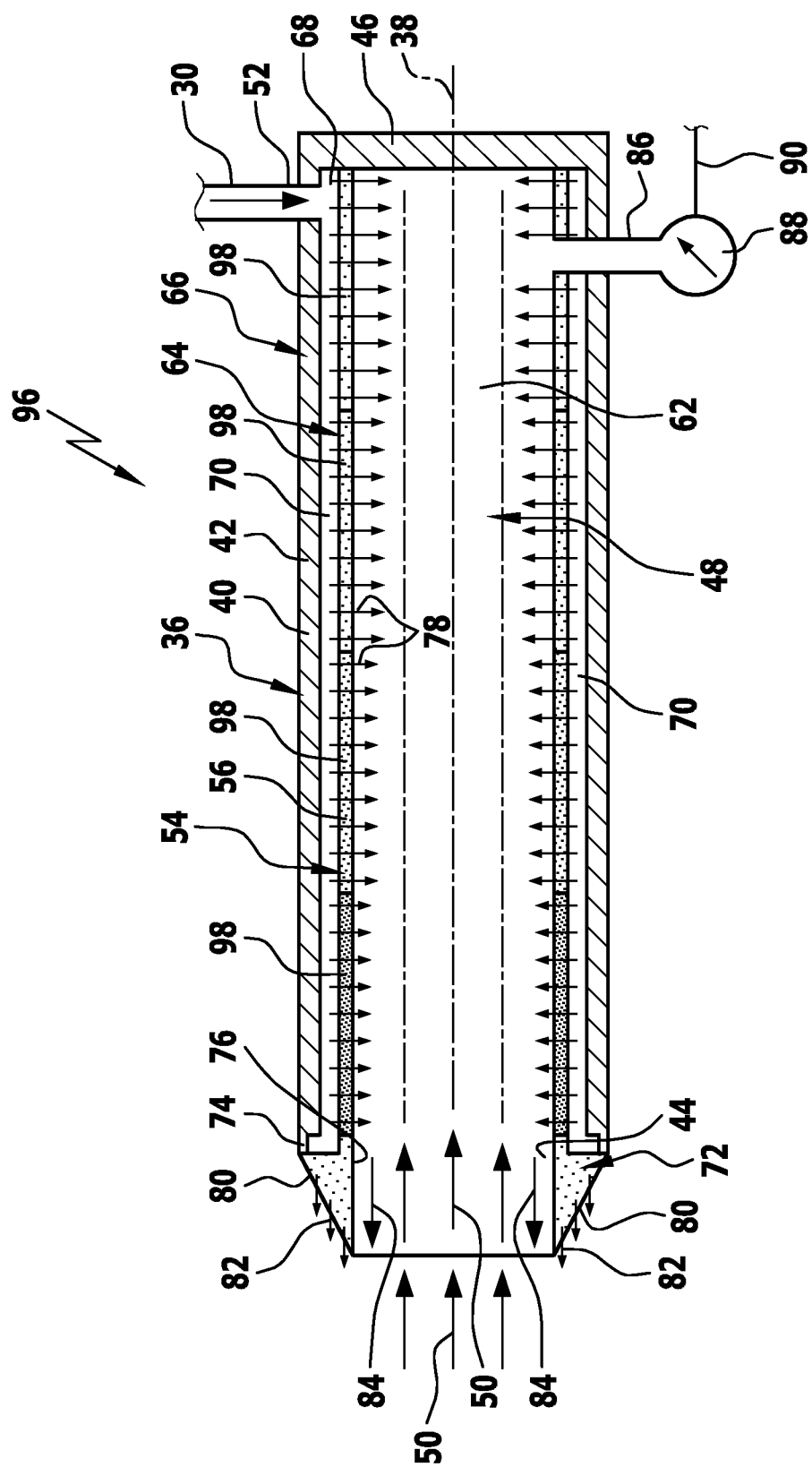
FIG. 7: shows a schematic sectional view of a further preferred embodiment of a dynamic pressure probe in accordance with the present disclosure.

FIG. 7 shows in a manner corresponding to FIG. 3 an advantageous embodiment of a dynamic pressure probe in accordance with the present disclosure, designated with the reference numeral 96. In the dynamic pressure probe 96, the inner body 54 in the region of the surrounding section 56 is subdivided into a multitude of (at present four) axially joined segments 98.

The segments 98 differ from each other in that they have different porosities. The porosity of the segment 98 that has the greatest distance from the inflow opening 44 is the greatest. The segment 98 upstream in the direction of the inflow opening 44 has a lesser porosity, the segment 98 upstream of that an even lesser porosity, and the segment 98 toward the inflow opening has the least porosity. The number and/or the cross section of passages of the inner body 54 therefore decrease in the direction of the inflow opening 44.

This offers the possibility for the pressure of the protective fluid and the volumetric flow of protective fluid to be greater on the side of the inner body 54 opposite the inflow opening 44 than on its side facing toward the inflow opening 44. This is symbolized in FIG. 7 by different lengths of the arrows 78. The pressure of the protective fluid and the volumetric flow thereof decrease from the rear wall 46 (the rearward section 58 is omitted in the dynamic pressure probe 96) to the inflow opening 44 with each segment 98. As a result, a pressure gradient forms which promotes the flow of the protective fluid in the direction of the arrow 84.

This proves to be advantages for the removal of detached particles out of the measuring space 62.

Figure 8:
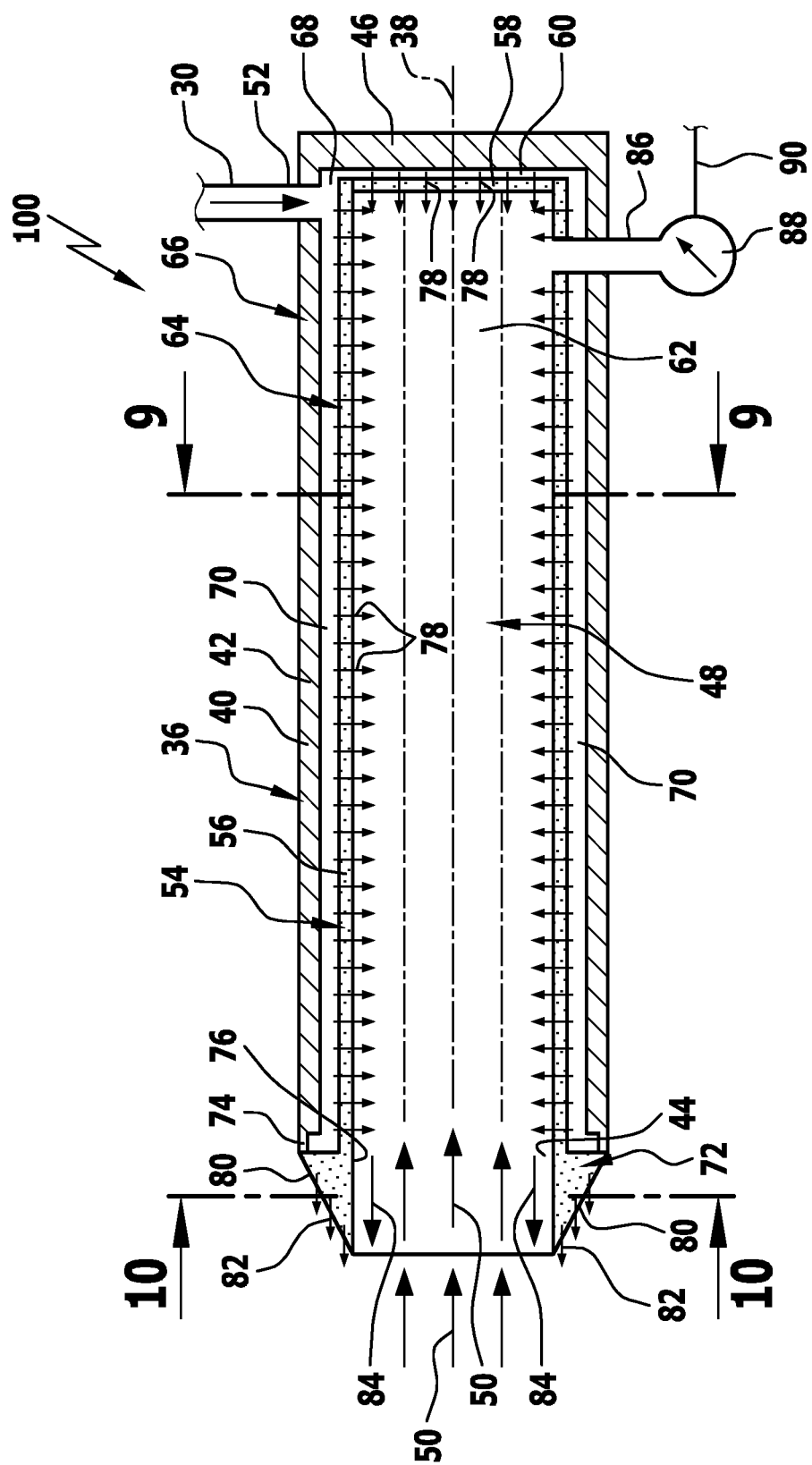
FIG. 8: shows a schematic sectional view of a further preferred embodiment of a dynamic pressure probe in accordance with the present disclosure.
Figure 9:
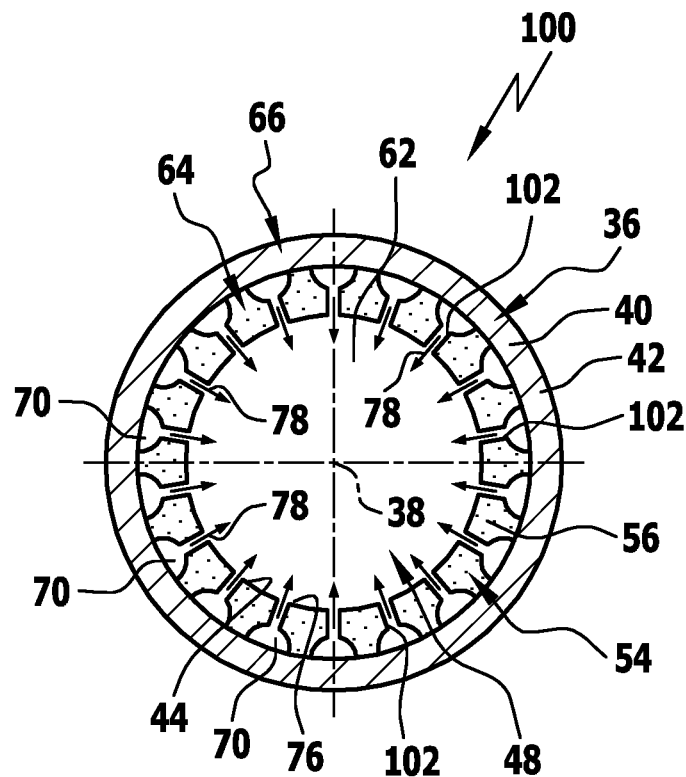
FIG. 9: shows a sectional view along the line 9-9 in FIG. 8.
Figure 10:
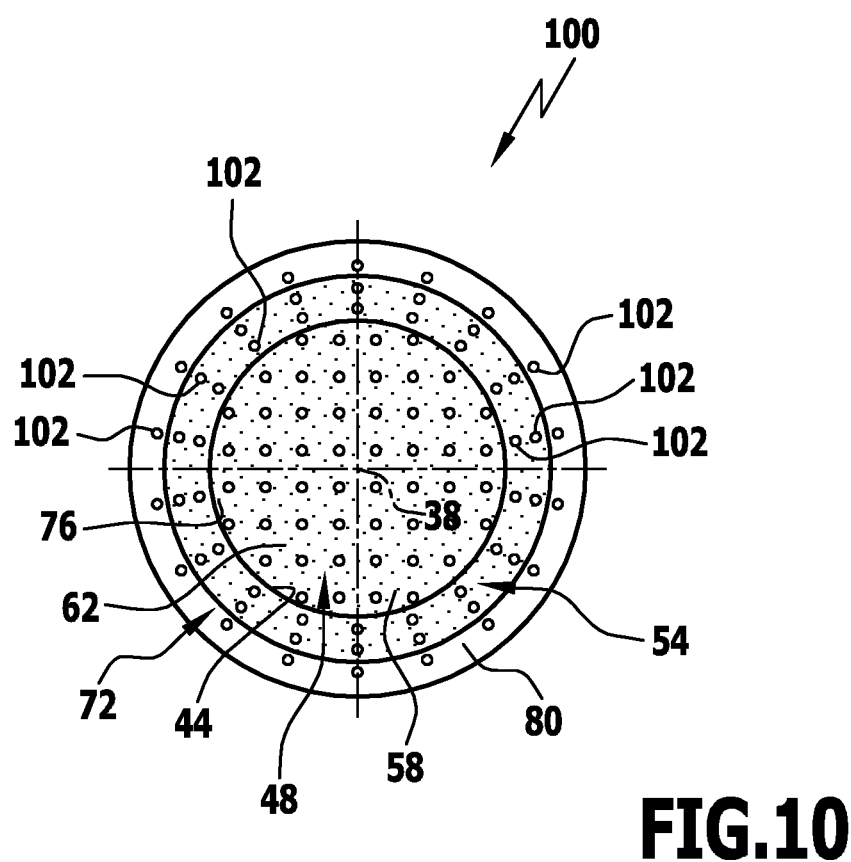
FIG. 10: shows a sectional view along the line 10-10 in FIG. 8.

FIGS. 8 and 9 show in a manner corresponding to FIGS. 3 and 4, respectively, an advantageous embodiment of a dynamic pressure probe in accordance with the present disclosure, designated with the reference numeral 100, wherein a schematic sectional view along the line 10-10 in FIG. 8 is additionally depicted in FIG. 10.

The dynamic pressure probe 100 differs from the dynamic pressure probe 24 in that the passages of the inner body 54 for the gaseous protective fluid are not or at least not only formed by the porous quality of the inner body 54. Instead, the passages 102 are introduced into the inner body 54 and configured as bores of the same, for example. The passages 102 are shown in FIGS. 9 and 10 and are not depicted in FIG. 8 for the sake of clarity.

The passages 102 are arranged on the surrounding section 56 in circumferential direction of the axis 38, aligned radially in relation to the latter, and spaced uniformly apart from each other, for example, axially and in circumferential direction.

Present at the front section 72 are a multitude of passages 102 which run axially parallel and are spaced uniformly apart from each other in circumferential direction of the axis 38. Passages 102 are arranged along presently three rings aligned concentric to the axis 38. Each ring of passages 102 comprises the same number of rings, wherein the passages 102 of different rings are positioned radially in relation to the axis 38.

The rearward section 58, too, comprises a multitude of passages 102 which are preferably arranged on the rearward section 58 according to a regular pattern and are aligned axially parallel.

In addition to the passages 102, provision may be made in the dynamic pressure probe 100 for further passages to be present due to the porous quality of the inner body 54.

The gaseous protective fluid flows via the passages 102 radially (at the section 56) and counter to the inflow direction 50 (at the section 58) into the measuring space 62. As in the preceding embodiments, a flow of protective fluid out of the measuring space 62 forms along the inner body 54 (arrow 84).

Provision may be made in the dynamic pressure probe 100 for the inner body 54 to be of such a nature that the pressure of the protective fluid and the volumetric flow thereof is greater on the side remote from the inflow opening 44 than on the side facing toward the inflow opening 44. This can be implemented, for example, in that the cross sectional area and/or the number of passages 102 per unit of length on the inner body, in particular in the region of the surrounding section 56, increases with increasing distance from the inflow opening 44. The increase may take place steadily and continuously or in steps. For example, the inner body 54 may be composed of individual segments 98, as in the dynamic pressure probe 96.

Figure 11:
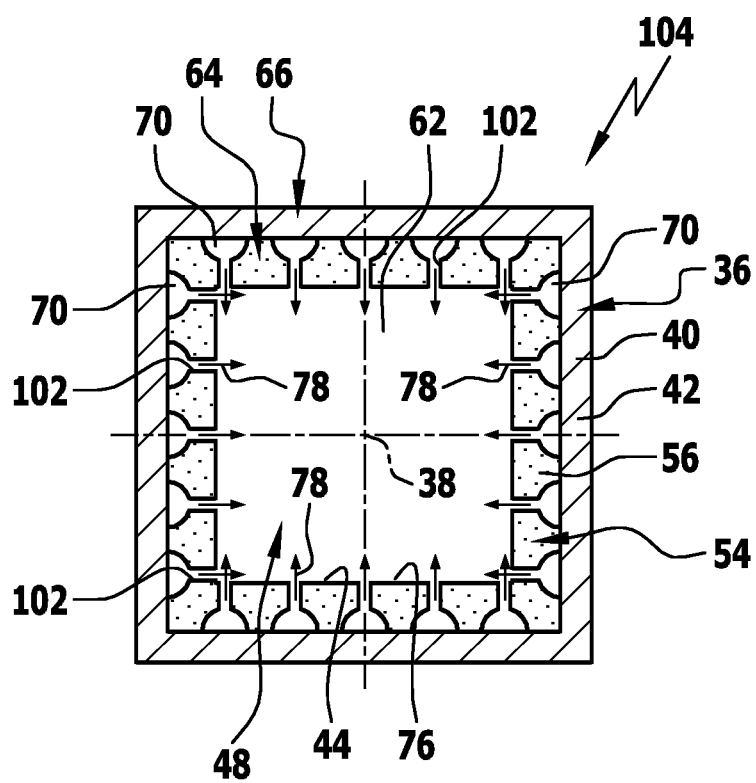
FIG. 11: shows a depiction corresponding to FIG. 9 in a further preferred embodiment of a dynamic pressure probe in accordance with the present disclosure.

FIG. 11 shows in a manner corresponding to FIG. 5 an advantageous embodiment of a dynamic pressure probe in accordance with the present disclosure, designated with the reference numeral 104. Passages 102 are present in the dynamic pressure probe 104, as in the dynamic pressure probe 100. Like with the dynamic pressure probe 92, the cross section is rectangular and in particular square.

Deviating from the schematic depiction of FIGS. 9 to 11, the passages 102 may have a different cross section, for example a smaller cross section. The number of passages 102 may deviate from the depiction.

The embodiments shown in FIGS. 12 to 17 are only schematically depicted, wherein details of the outer body 36 and the inner body 54 regarding the passages thereof are not shown.

In the embodiment of a dynamic pressure probe 106 in accordance with the present disclosure according to FIG. 12, the rear wall 46 of the outer body 36 is omitted. Instead, an outflow opening 108 is formed in the wall 40. The inner body does not have the rearward section 58, but instead a through-opening 110 is present. The medium is thereby able to flow through the dynamic pressure probe 106. This reduces the probability that particles accumulate. The inclination toward icing is reduced.

For damming the medium, the cross section of the measuring space 62 in the inflow direction 50 is reduced over a section of the extent of the inner body 54. For this purpose, the inner body 54 has in about the last third of its extent a tapering in order to reduce the cross section of the measuring space 62 and thereby increase the dynamic pressure on the side of the measuring space 62 remote from the inflow opening 44. The outer body 36 is also of tapered configuration.

Depending on the level of the pressure of the protective fluid, provision may be made in the dynamic pressure probe 106 for a flow of protective fluid counter to the inflow direction 50 through the inflow opening 44 to form to the front, or the protective fluid may exit through the through-opening 110 and the outflow opening 108 after entering into the measuring space 62 and, as the case may be, removing deposits. The same applies to the embodiment in accordance with FIGS. 13, 15, and 17 (the two latter with an opened closing element).

The dynamic pressure probe 112 in accordance with the present disclosure, according to FIG. 13, is likewise open on the side opposite the inflow opening 44, wherein an outflow opening 108 and a through-opening 110 are provided. In contrast to the dynamic pressure probe 106, the outflow opening 108 and the through-opening 110 are configured as apertures of the otherwise present rear wall 46 and the rearward section 58, respectively.

An embodiment of a dynamic pressure probe in accordance with the present disclosure, shown in FIGS. 14 and 15 and designated with the reference numeral 114, has, like the embodiment according to FIG. 12, the outflow opening 108 and the through-opening 110. The dynamic pressure probe 114 has a closing element 116 at the openings. The closing element 116 is presently configured as a pivotable flap 118 which is transferable from a closing position for closing the outflow opening 108 (FIG. 14) into an opening position for unblocking the outflow opening 108 (FIG. 15) and vice versa.

In the normal operation of the dynamic pressure probe 114, the outflow opening 108 is closed by the closing element 116. The closing element 116 in the opening position may unblock the measuring space 62 in the back, so that particles, moisture, etc. may be removed. The closing element 116 may, for example, be actuated regularly or depending on need. To this end, the sensor device 22 may have a control unit for controlling a drive for the closing element 116. The control may alternatively be carried out by the evaluation unit 26.

The advantageous embodiment of the dynamic pressure probe in accordance with the present disclosure, depicted in FIGS. 16 and 17 and designated with the reference numeral 120, like the dynamic pressure probe 114, comprises a closing element 116. In this embodiment, the closing element 116 is configured as a slide 122 which, for example, may be displaced perpendicular to the axis 38 in order to selectively close (FIG. 16) or unblock (FIG. 17) the outflow opening 108. With the dynamic pressure probe 120, too, a control of a drive for the closing element 116 by the sensor device 22 is possible, for example through the control unit or the evaluation unit 26.

The dynamic pressure probe in accordance with the present disclosure may comprise a heating device 124. The heating device 124 is shown for example and in sections in the dynamic pressure probe 106 depicted in FIG. 12, though it could of course also be present in all dynamic pressure probes 24, 92, 94, 96, 100, 104, 112, 114 and 120.

The heating device 124 has, e.g., a heating coil with windings 126 which surround the axis 38 and run in the side wall 42 or in the section 56 of the inner body 54. An arrangement of the windings 126 between the side wall 42 and the section 56 is also conceivable. FIG. 12 shows a few windings 126 for example.

The windings 126 may be acted upon with current in order to electrically heat the dynamic pressure probe 106. A control of the heating device 124 by the sensor device 22 is conceivable. The latter may, to this end, have a control unit, or the controlling may be carried out by the evaluation unit 26.

The invention claimed is:

1. A dynamic pressure probe for a sensor device for determining the relative speed of an object and a medium surrounding said object, the dynamic pressure probe comprising:
   an outer body with a wall in which an inflow opening is formed and which encloses an inner space, the wall having a side wall surrounding the inner space,
   an inner body comprising passages being arranged at least partially in the inner space and enclosing a measuring space as a constituent part of the inner space, the medium being able to flow through the inflow opening and to be dammed in the measuring space,
   an interspace formed between the wall and the inner body, the interspace comprising channels formed between the side wall of the wall and the inner body, with the channels being flow-connected to the passages,
   wherein an inlet opening or a connection for supplying a protective fluid is arranged or formed on or in the wall, the protective fluid being able to flow through the inlet opening or the connection into the channels, so as to act upon the inner body on a side remote from the measuring space, and wherein the protective fluid is able to flow into the measuring space through the passages.

2. The dynamic pressure probe in accordance with claim 1, wherein the dynamic pressure probe is of tubular configuration at least in sections, with a tubular outer body and a tubular inner body aligned coaxial to the outer body.

3. The dynamic pressure probe in accordance with claim 1, wherein the dynamic pressure probe has a round or polygonal cross section in relation to an inflow direction of the medium through the inflow opening into the measuring space.

4. The dynamic pressure probe in accordance with claim 1, wherein the inlet opening or the connection is arranged on a side of the outer body opposite the inflow opening.

5. The dynamic pressure probe in accordance with claim 1, wherein at least one of the following applies:
   the inner body is accommodated in the outer body by positive fit and is supported on the side wall; or
   the wall has a rear wall opposite the inflow opening and the inner body has a rearward section opposite the inflow opening, wherein an interspace flow-connected to the passages is formed between the rear wall and the rearward section.

6. The dynamic pressure probe in accordance with claim 1, wherein the passages are configured in such a way that the protective fluid flows into the measuring space according to at least one of the following:
   transverse in relation to an inflow direction of the medium into the measuring space; or
   counter to an inflow direction of the medium into the measuring space.

7. The dynamic pressure probe in accordance with claim 1, wherein at least one of the following applies:
   the inner body extends over the entire length of the inner space; or
   the inner body extends along the entire inner circumference of the wall.

8. The dynamic pressure probe in accordance with claim 1, wherein the inner body has a front section which protrudes from the inner space over a rim of the inflow opening and which comprises further passages which are aligned in the direction facing away from the inner space.

9. The dynamic pressure probe in accordance with claim 8, wherein the further passages counter to an inflow direction of the medium into the measuring space.

10. The dynamic pressure probe in accordance with claim 8, wherein the further passages comprise outlet openings at the front section, the outlet openings arranged on an outer side of the dynamic pressure probe.

11. The dynamic pressure probe in accordance with claim 1, wherein the passages of the inner body are spaced uniformly apart from each other according to at least one of the following:
   along an inflow direction of the medium into the measuring space; or
   along a circumference of the inner body enclosing the measuring space.

12. The dynamic pressure probe in accordance with claim 1, wherein the inner body, entirely or partially, comprises at least one of the following or is made of one or more of the following:
   a porous material, wherein the passages are formed by the porous quality of the material;
   a composite material;
   a metallic material;
   a plastics material;
   a ceramic material.

13. The dynamic pressure probe in accordance with claim 12, wherein the metallic material is a metal foam or a sintered metal.

14. The dynamic pressure probe in accordance with claim 12, wherein the ceramic material comprises a CMC material (ceramic matrix composite).

15. The dynamic pressure probe in accordance with claim 1, wherein the passages are configured as channels in the inner body.

16. The dynamic pressure probe in accordance with claim 15, wherein the passages being channels are configured as bores.

17. The dynamic pressure probe in accordance with claim 1, wherein the dynamic pressure probe comprises a heating device for heating at least one of the inner body and the outer body.

18. The dynamic pressure probe in accordance with claim 17, wherein at least one of the following applies:
   at least one of the cross sectional area and the number of passages per unit of length on the inner body increases with increasing distance from the inflow opening; or
   the inner body comprises a multitude of joined segments with passages, wherein at least one of the cross sectional area and the number of passages per unit of length on different segments differs from each other.

19. The dynamic pressure probe in accordance with claim 1, wherein the inner body is able to be acted upon with protective fluid in such a way and/or is configured in such a way that at least one of a volumetric flow of protective fluid and the pressure of the protective fluid which flows through the passages into the measuring space increases from a side of the inner body remote from the inflow opening to a side facing toward the inflow opening.

20. The dynamic pressure probe in accordance with claim 1, wherein an outflow opening for the outflow of the medium from the measuring space is formed in the wall on the side opposite the inflow opening, and wherein the inner body has a through-opening for the medium.

21. The dynamic pressure probe in accordance with claim 20, wherein the dynamic pressure probe comprises a closing element which is arranged at the outflow opening and which is transferable from a closing position for at least partially closing the outflow opening into an opening position for unblocking the outflow opening.

22. The dynamic pressure probe in accordance with claim 1, wherein the inner body has at least in sections a tapering in the inflow direction of the medium into the measuring space.

23. The dynamic pressure probe in accordance with claim 1, wherein the protective fluid is a gas.

24. A flying object comprising a sensor device with a dynamic pressure probe, wherein at least one of the pressure and the temperature of the medium in a measuring space is determinable with the sensor device, the dynamic pressure probe comprising:
an outer body with a wall in which an inflow opening is formed and which encloses an inner space, the wall having a side wall sur-rounding the inner space,
an inner body comprising passages being arranged at least partially in the inner space and enclosing the measuring space as a constituent part of the inner space, medium being able to flow through the inflow opening and to be dammed in the measuring space,
an interspace formed between the wall and the inner body, the interspace comprising channels being formed between the side wall of the wall and the inner body, with the channels being flow-connected to the passages,
wherein:
arranged or formed on or in the wall is an inlet opening or a connection for the supply of a protective fluid, the protective fluid being able to flow through the inlet opening or the connection into the channels, so as to act upon the inner body on a side remote from the measuring space;
and wherein the protective fluid is able to flow into the measuring space through the passages.

25. The flying object in accordance with claim 24, wherein a measuring conduit is provided, via which a measuring element of the sensor device arranged external to the outer body is in flow-connection with the measuring space.

26. The flying object in accordance with claim 24, wherein at least one of the following applies:
a supply conduit for protective fluid connected to the dynamic pressure probe is provided which is in or is able to be brought into flow-connection with the interior of a cabin, with an engine of the flying object, or a reservoir; or
the sensor device comprises a further dynamic pressure probe, wherein characteristic variables relevant to flight, determined on the basis of measurement data which was obtained by the sensor device using both dynamic pressure probes, are able to be checked for conformance.

27. The flying object in accordance with claim 24, wherein the flying object is an airplane.

* * * * *